Jan. 29, 1963 W. A. KIMSEY 3,075,503
HYDRAULIC SCREW FEED MECHANISM
Filed Aug. 1, 1960 4 Sheets-Sheet 1
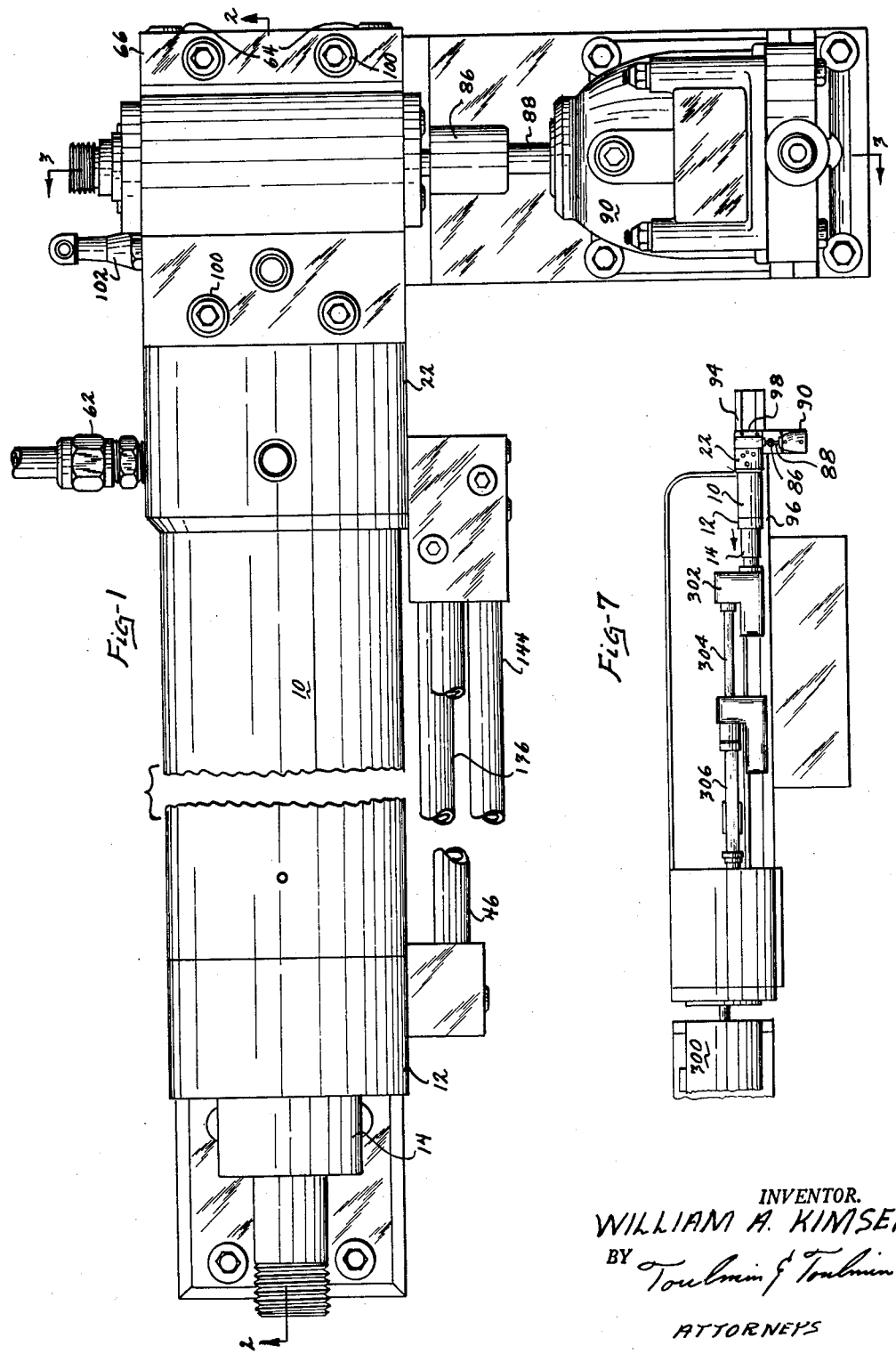
INVENTOR.
WILLIAM A. KIMSEY
BY
ATTORNEYS

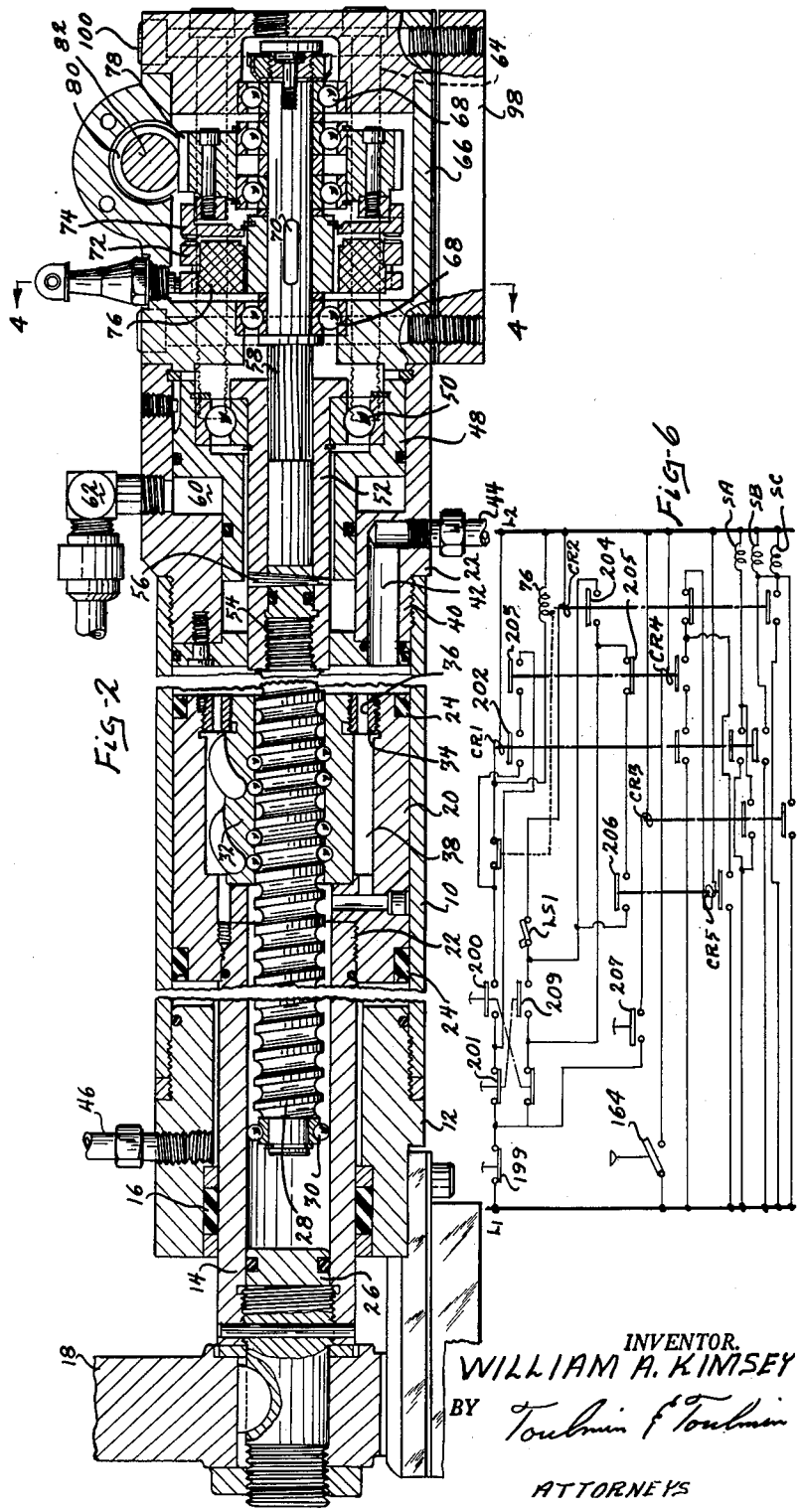

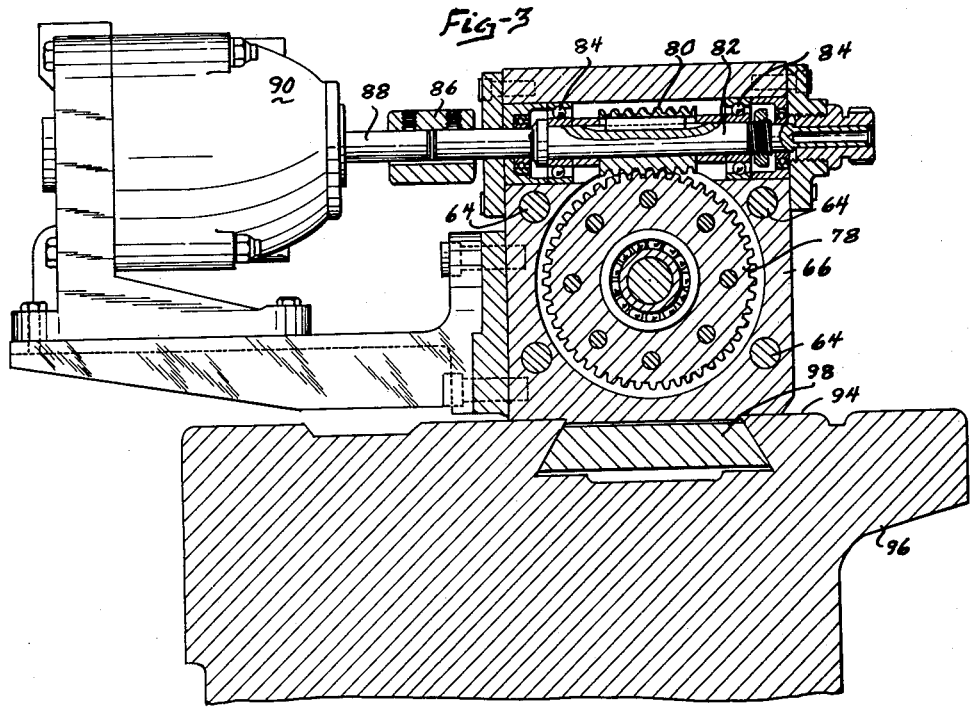
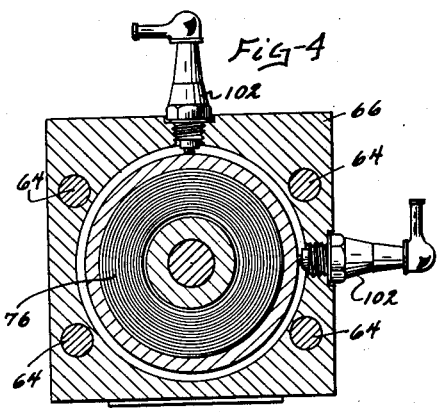

Jan. 29, 1963 W. A. KIMSEY 3,075,503
HYDRAULIC SCREW FEED MECHANISM
Filed Aug. 1, 1960 4 Sheets-Sheet 4

INVENTOR.
WILLIAM A. KIMSEY
BY Toulmin & Toulmin
ATTORNEYS

United States Patent Office 3,075,503
Patented Jan. 29, 1963

3,075,503
HYDRAULIC SCREW FEED MECHANISM
William A. Kimsey, Cincinnati, Ohio, assignor to The R. K. Le Blond Machine Tool Company, Cincinnati, Ohio, a corporation of Ohio
Filed Aug. 1, 1960, Ser. No. 46,663
11 Claims. (Cl. 121—45)

This invention relates to a hydraulic screw feed mechanism and is particularly concerned with an improved arrangement for very precisely controlling the speed of movement of a reciprocating member, such as a hydraulically driven member, without in any way detracting from the speed of movement of the member during rapid advance and retraction thereof.

In the machine tool art in particular, a great many reciprocating hydraulic motors are employed and including hydraulic motors for controlling the rate of advance of a cutter member such as a drill or a boring tool. While hydraulic motors are quite adequate for developing ample power for reciprocation of such members, and are convenient to install and control generally, difficulty has always been experienced in exercising a precise control of the rate of movement of the members during the time that they are under load. This comes about on account of the compressibility of the hydraulic fluid, and the tendency for the speed of movement of the hydraulic motor to vary under changing load conditions.

Thus, a tendency is introduced in certain instances for the cutting tool to chatter, or the speed must be set sufficiently low that the cutting tool does not tend to chatter or to hog into the work or otherwise cut in an inefficient manner. Accordingly, in order to effect highly efficient cutting conditions, it is essential for the speed of movement of the cutting member and, therefore, the hydraulic motor driving the cutting member, to be controlled extremely accurately. By such accurate control more rapid cutting speeds can be maintained because the speed can be set to the allowable maximum when the cutting member does not tend to jump ahead if a soft spot is encountered, or commence to chatter on account of compressibility of the hydraulic fluid that is actuating the motor.

Another feature that is desirable in connection with hydraulically driven cutting members and the like is to provide means for automatically retracting the cutting member when a predetermined resistance to the advancing movement thereof is encountered. Such resistance might occur on account of hard spots in the work piece being cut, or, as is more often the case, the tool becoming dull. When this occurs it is most advantageous to interrupt the cutting operation and, preferably, to retract the cutting tool from the workpiece so that the cutting tool can be inspected and replaced if it is dull or damaged.

Having the foregoing in mind, it is a primary object of the present invention to provide a hydraulic motor arrangement that includes means for precisely controlling the speed of reciprocation thereof.

Another object is the provision of the hydraulic motor including means for precisely controlling the speed of reciprocation thereof during a portion of the stroke thereof and which portion can be preselected and precisely determined.

A still further object of this invention is the provision of a hydraulic motor including a rotating screw engaging the reciprocating portion of the hydraulic motor for controlling the rate of movement thereof and the provision of which screw does not detract from the thrust that can be developed by the hydraulic motor.

Still a further object of this invention is the provision of a screw controlled hydraulic motor which is relatively simple to construct and wherein the provision of the speed controlling screw does not materially detract from the thrust that can be developed by the hydraulic motor.

Still another object of this invention is the provision of a hydraulic motor having a screw for controlling the rate of movement thereof which is adapted for developing a control signal in response to a predetermined change in the load on the motor whereby the motor can be automatically reversed when abnormal operating conditions are encountered.

Still another object of this invention is the provision of a reciprocating hydraulic ram and a screw extending therein and threaded to the ram in which a relatively slender screw can be employed for controlling the rate of movement of the ram without the screw buckling and without the screw detracting from the total thrust of the motor.

These and other objects energized become more apparent upon reference to the following specifications taken in connection with the accompanying drawings in which:

FIGURE 1 is a plan elevational view partly broken away showing a screw control hydraulic motor according to this invention;

FIGURE 2 is a vertical section indicated by line 2—2 on FIGURE 1 showing the hydraulic ram and the control screw therein;

FIGURE 3 is a sectional view indicated by line 3—3 on FIGURE 1 showing a drive for the control screw by means of which the rate of movement of the ram is regulated;

FIGURE 4 is a sectional view indicated by line 4—4 on FIGURE 2 showing, more or less diagrammatically, the connections to an electric clutch forming a part of the device;

FIGURE 6 is a diagrammatic representation of an electric control circuit adapted for effecting control of the device by way of controlling the hydraulic circuit; and FIGURE 7 is a diagrammatic view of a boring machine having a boring slide driven by a motor according to this invention.

Figure 5:
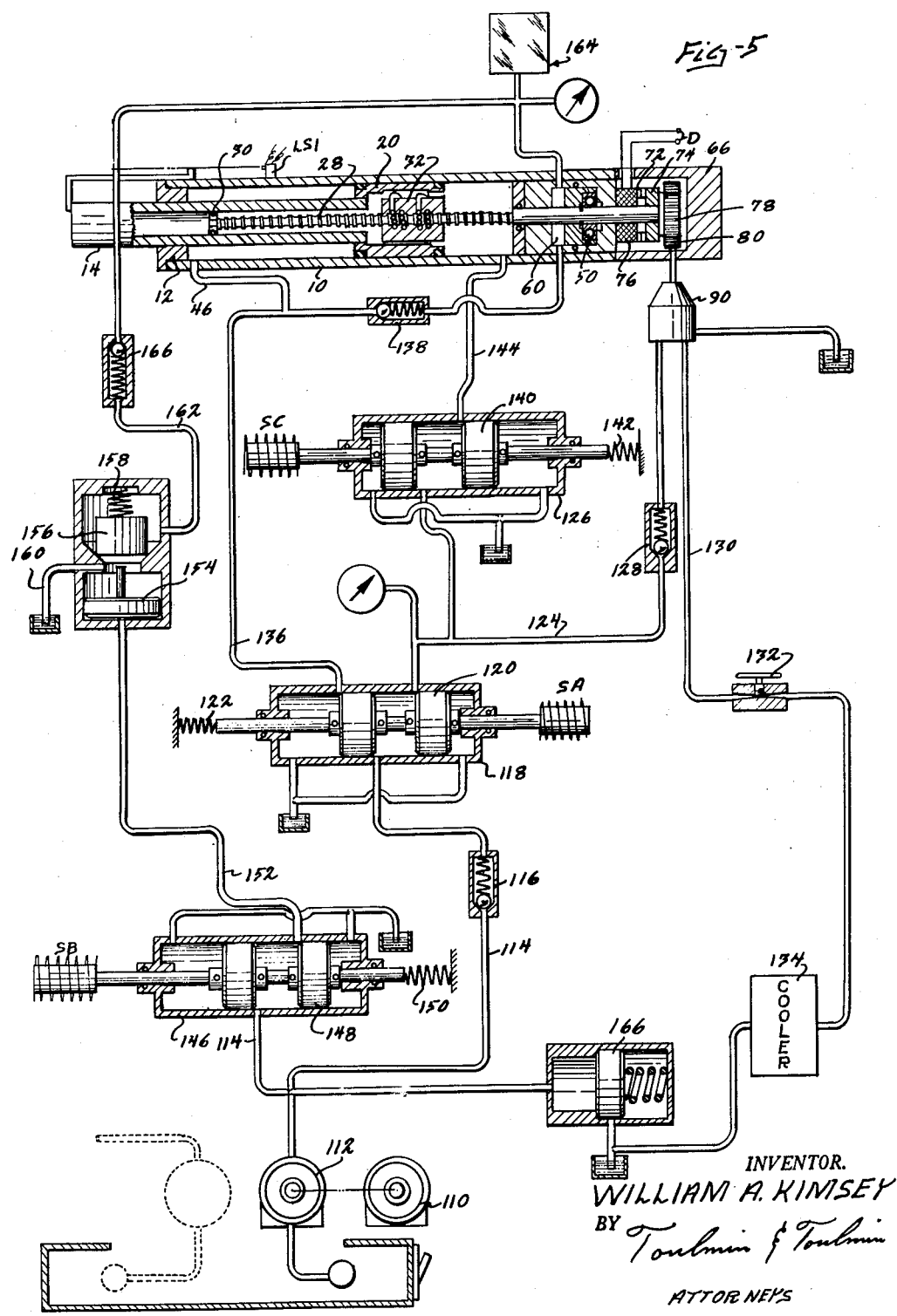
FIGURE 5 is a diagrammatic representation of a preferred hydraulic operating circuit for a device of the present invention.

Referring to the drawings somewhat more in detail, the structure of the present invention, upon reference to FIGURES 1 through 4, will be seen to comprise a cylinder 10 having, at its left end as viewed in FIGURES 1 and 2 an end closure member 12. Extending through the end closure member is a ram or plunger 14 sealed to the closure member by sealing means 16. The end of plunger 14 is adapted for being connected with an arm 18 to which may be attached a drilling or boring tool or the like for carrying out a work operation.

Reciprocably mounted in the cylinder is piston 20 connected with ram 14 as by the threads 22. Piston 20 has seals 24 at its opposite ends for sealingly engaging the wall of the cylinder thereby to divide the inside of the cylinder to advancing and retracting regions.

The ram or plunger 14 is hollow and has its left end closed sealingly by a plug member 26. The interior of the plunger 14 is adapted for rotatably and reciprocably receiving a screw 28. The left end of the screw is supported inside plunger 14 by ball bearing 30, and passes through a ball bearing nut 32 which is fixedly mounted in piston 20. The screw and nut are of the type known as a "Sagnaw" screw and is a well known type of extremely low friction ball bearing nut and screw.

The ball bearing nut 32 is held in a recess in piston 20 by means of a lock ring 34 threadedly engaging both the piston and the nut. This lock ring has drilled holes 36 therein that communicate with passage means 38 extending downwardly along the nut and inwardly to the inside of plunger 14 so that as the plunger and screw reciprocate relatively fluid will not be entrapped inside the plunger and also so that pressure fluid exerted on the right or advancing side of piston 20 will pass through the piston and into the plunger and stand against the plug 26, whereby the full area of the piston is available for developing thrust on plunger 14.

Rightwardly of piston 20, cylinder 10 has connected therewith, as by threading, and sealed thereto, another closure member 40. Closure member 40 is provided with passage means 42 communicating with a conduit 44 by means of which fluid is supplied to the right, or advancing, side of piston 20.

The left, or retracting, side of piston 20 is supplied with fluid from a conduit 46 that is connected to closure member 12 and communicates with the left side of the piston via the annular passage between the closure member and plunger 14.

Closure member 40 at the right end of cylinder 10 has reciprocably sealingly mounted therein a bearing block member 48 in which is mounted a ball bearing 50. The inner race of ball bearing 50 supports a sleeve 52 which, at its left end, is rigidly attached to the right end of screw 28 as by the threads 54 and tapered pin 56. Toward its right end sleeve 52 has a splined connection with a shaft 58. At this point it will be evident that the block 48 is movable axially in closure member 40 depending on the tension developed on screw 28. Normally, movement leftwardly in closure member 40 of block 48 is prevented by fluid entrapped in the space 60 confined within closure member 40 by the said block. This space communicates with a conduit 62 and the pressure of the fluid in this space is employed as a stimulus for control purposes that will serve to indicate abnormal operating conditions.

At its extreme right end there is attached to closure member 40, as by means of elongated cap screws 64, a housing member 66 for a motor and clutch unit that drives the screw in rotation. The shaft 58 extends into housing 66 and is supported therein by ball bearings 68 and within the housing has keyed thereto as by key 70 one portion 72 of an electric clutch having a second portion 74 adapted for driving engagement with portion 72 upon the energization of a clutch coil 76. Such electric clutches are known and comprise means whereby energization of a coil will bring two parts into driving engagement whereas deenergization of the clutch will permit the clutch parts to separate and to interrupt the said driving engagement.

The clutch part 74 of the aforementioned electric clutch, and which is the movable part, has a slideable driving connection with a worm wheel 78 rotatably supported on shaft 58. It will be evident that engagement of the aforementioned clutch parts will drivingly connect the worm wheel with the shaft whereas disengagement of the clutch parts will interrupt the driving engagement between the worm wheel and the shaft.

Worm wheel 78, as will best be seen in FIGURES 2 and 3, meshes with a worm 80 mounted on a shaft 82 extending transversely of housing 66 and journalled therein on bearings 84. The worm shaft 82 is connected by coupling 86 with output shaft 88 of a variable speed hydraulic motor 90 carried on a mounting bracket 92 attached to the side of housing 66. FIGURES 2 and 4 will also show that housing 66 is adapted for resting on the tops of ways 94 of a machine bed 96. Between these ways is a dove tail groove in which is a dove tail clamp member 98 that can be clamped tight, as by the cap screws 100 extending through housing member 66. This arrangement permits the hydraulic motor and the control motor for driving the screw to be adjusted longitudinally of a machine bed as a single unit to accommodate for different lengths of workpieces and the like.

Shaft 82 at its end opposite motor 90 has means 83 for the connection of a tachometer that will indicate screw speed and, therefore, ram speed.

FIGURE 4 shows how brush holders 102 can be provided in housing 66 for effecting electrical contact with slip rings forming a part of the electric clutch unit so that the energization of the clutch coil can be controlled.

*Hydraulic Circuit*

Referring now to FIGURE 5, there is shown therein the hydraulic circuit by means of which the operation of the device is controlled.

In this hydraulic circuit is a sump or reservoir 110 to which is connected pump 112 that discharges pressure fluid to a conduit 114 that has included therein a pressure loaded check valve 116. The discharge side of the check valve 116 is connected with the inlet port of a first control valve 118 having a valve member 120 therein urged in one direction by a spring 122 and adapted for being moved to its opposite end position by energization of a solenoid SA.

Valve member 120 when shifted rightwardly by energization of solenoid SA connects conduit 114 with conduit 124 which has one branch leading to the pressure inlet port of a second control valve 126 and another branch leading through a spring loaded check valve 128 to the inlet of the rotary hydraulic motor 90 that drives the worm 80. The discharge side of motor 90 is connected by way of conduit 130 through adjustable choke 132 and cooler 134 back to the reservoir.

When valve member 120 is shifted leftwardly, under the influence of spring 122, it connects conduit 114 with conduit 136 leading to conduit 46 which is connected to the retraction side of the hydraulic motor. Conduit 136 is also connected through a pressure loaded check valve 138 with the space 60 confined in closure member 40 by bearing block 48.

Valve 126 has a valve member 140 therein adapted for being urged toward the right by spring 142 and for being moved toward the left by energization of a solenoid SC. When the valve is in its left hand position, the branch of conduit 124 leading to valve 126 is connected with conduit 144 leading to the advancing side of the hydraulic motor. When the valve member is urged toward the right by the spring 142 upon deenergization of solenoid SC, the conduit 144 is blocked. This valve therefore provides means for blocking fluid in the advancing side of the motor should this be desired.

The pressure conduit 114 leading from pump 112 has a branch leading to the inlet port of still another valve 146 which has a valve member 148 therein normally urged rightwardly by a spring 150 and adapted for being moved to its left hand position by energization of a solenoid SB. When the valve member is in its right hand position the branch of conduit 114 leading thereto is blocked and when the valve member is in its left hand position this conduit is connected with a conduit 152 leading to the pilot piston 154 of a pilot operated check valve which has a check valve member 156 urged toward a seat by a spring 158. On the downstream side of the seat there is a conduit 160 leading to the reservoir and on the upstream side of the seat and communicating with the upper end of valve member 156 is a conduit 162 leading to the aforementioned space 60. Conduit 162 has also connected therewith a pressure sensitive switching arrangement generally indicated at 164 which is employed for control purposes.

The pressure conduit 114 leading from the pump also has a connection with the sump through a relief valve 116 adapted for opening at a predetermined pressure.

The aforementioned pressure loaded check valves, by way of example, may be selected as follows; check valve 116 may be preloaded to 75 pounds per square inch, check valve 128 may carry the same preload, and check valve 138 may be preloaded to 5 pounds per square inch.

A still further check valve at 166 is included in conduit 162 and this check valve may be preloaded to the amount of 50 pounds per square inch. This check valve is for the purpose of retaining fluid entrapped in the aforementioned space 60.

*Electrical Circuit*

A typical electrical circuit for controlling the hydraulic circuit and, therefore, the operation of the machine, is shown in FIGURE 6.

In this figure, the power lines are indicated at L1 and L2. Connected between these lines in series with a normally closed stop feed switch 199, and a normally closed blade of a retraction switch 201, a normally opened blade of a feed switch 200, and a normally closed blade of a relay CR2 is the coil of a relay CR1. In parallel with the coil of relay CR1 is the feed clutch solenoid 76.

Relay CR1 has a holding circuit through its normally opened blade 202 and a normally opened blade 203 of a relay CR4.

There is also connected between the power lines the coil of relay CR2 which is in series with a limit switch LS1 adapted for being opened by the ram 14 in its retracted position, in series with limit switch LS1 is a normally open blade of retraction switch 201 and a normally closed blade of the feed switch 200 in the aforementioned stop feed switch 199. A holding circuit for the coil of relay CR2 is established through its normally opened blade 204 and also through a normally closed blade 205 of relay CR4 and a normally opened blade 206 of a relay CR5.

The energizing coil of a relay CR3 is connected between the power lines in series with a normally open rapid advance switch 207 and the aforementioned stop feed switch 199.

The energizing coil for relay CR4 is connected between the power lines in series with the normally open pressure switch 164 which closes when the ram is moving at said rate and which opens as the advancing movement of the ram is slowed down for any reason.

The energizing coil for relay CR5 is connected between the power lines in series with a normally closed blade of relay CR2, a normally open blade of relay CR4, and a normally open blade of relay CR1. A holding circuit for relay CR5 includes the said normally closed blade of relay CR2, and a normally open blade of relay CR5.

The valve solenoid SA is connected between the power lines in series with a normally open blade of relay CR1 which is in parallel with a normally open blade of relay CR3.

The valve solenoids SB and SC are connected in parallel between the power lines and in series with a normally open blade of relay CR1 which is in parallel with a normally open blade of relay CR2 and a normally open blade of relay CR3.

*Operation*

In operation, the machine is started by closing feed switch 200. This will energize relay CR1 and clutch solenoid 76 and will also energize the valve solenoids SA, SB and SC. When the valve solenoids are energized, valve member 120 is moved toward the right while valve member 140 is moved toward the left and valve member 148 is also moved to the left. This will direct a supply of pressure fluid through valve 118 to valve 126 and therethrough to the advancing side of the piston 20 of the hydraulic motor while, simultaneously, the retraction side of the piston is connected with exhaust through valve 118. Since the said clutch solenoid 76 is also energized, the ram will commence to move at feed rate, and pressure will be developed on pressure switch 164 which will cause closing thereof to bring about energization of relay CR4. Closing of relay CR4 establishes a holding circuit for relay CR1 so that the ram continues to advance at feed rate.

The purpose of energizing the said clutch solenoid 76 immediately is to prevent the ram from jumping ahead which is undesirable, particularly at the initiation of a new work cycle at which time the cutting tool might be quite close to the work piece.

The closing of relay CR4, referred to above, also energizes relay CR5 simultaneously with establishing the holding circuit for relay CR1.

If the pressure at the pressure switch would drop, indicating excessive tool pressure, or indicating that the boring slide has completed its advancing stroke, and engaged a positive stop, the pressure switch will open thus deenergizing relay CR4. When relay CR4 opens, relay CR1 is deenergized and this also deenergizes the said clutch solenoid 76 and the valve solenoid SA. Valve solenoids SB and SC, however, remain energized and the ram commences to retract. The deenergization of valve solenoid SA permits its valve member 120 to move to the left to direct fluid to the retraction side of piston 20 while simultaneously the advancing side thereof is connected to exhaust.

When the ram reaches its fully retracted position, limit switch LS1 is opened thus deenergizing relay CR2 which effects deenergization of valve solenoids SB and SC which interrupts the supply of fluid to the ram so that it comes to a halt. The deenergization of valve solenoid SA at the time that retraction of the ram commences, interrupts the supply of fluid to the feed control motor 90 so that at that time, this motor also came to a halt. Since the clutch solenoid 76 also was deenergized, the said screw could rotate freely so that rapid retraction of the ram could be had.

If, for any reason, rapid advance of the ram is desired, this can be obtained by closing the rapid advance switch 207 which will cause energization of relay CR3 which will be accompanied by energization of valve solenoids SA, SB and SC but without causing said clutch solenoid 76 to become energized. Under these conditions the ram will advance rapidly without any control of the feed rate. It might be desired to effect such rapid advance of the ram for setting up processes, or when, for some other reason, there might be a substantial distance for the tool to be advanced before it engaged the work.

From the foregoing description it will be evident that the advancing and retracting movements of the piston and plunger can take place substantially without restriction on account of the screw connection thereto because during rapid advance and rapid retraction of the plunger the screw is unclutched from its driving worm wheel and is thus free to rotate at a high rate of speed. On account of the ball bearing nut that engages the screw, there is very little friction between the nut and screw and the screw can thus rotate at extremely high rates of speed with development of only a small amount of thrust thereon by the nut. This thrust is the only thing that detracts from the available thrust for driving the piston in either direction at high speed and, since the plunger at this time is only lightly loaded, it follows that the plunger can move in its rapid advance and rapid retraction directions at high speed. Whenever the clutch coil is energized, however, and the clutch parts engage, the rate of movement of the piston and plunger is extremely closely controlled. At this time, the thust of the piston against the screw, and which will tend to exert a torque on the screw, is not effective for changing the drive rate of the screw on account of the fact that this torque is ineffective for acting backwardly through the worm wheel and worm to change the speed of the hydraulic screw driving motor 90. With this in mind, it is preferably for the worm and wheel connecting the motor 90 with the screw to be of the self-locking type, which is to say the type in which the worm can drive the worm wheel but wherein the worm wheel is ineffective for driving the worm.

It will also be evident from the foregoing description of the electric and hydraulic circuits, that while opening of the pressure switch, during feed movement, will be effective for bringing about automatic retraction of the ram, the ram can also be brought to a halt at any time by opening of switch 199. Further, automatic retraction of the ram can be initiated manually by depressing the retraction switch which will close its blade 209 and thus effect energization of relay CR2.

It has been mentioned before that the arrangement of the present invention is particularly adapted for drilling or boring machines or the like and, in this connection, it might be pointed out that the arrangement of the present invention finds particular utility in a deep hole high speed boring or drilling machine of the type illustrated in the issued Carlstedt Patent No. 2,903,916 and shown diagrammatically in FIGURE 7. In FIGURE 7 the motor arrangement of the present invention is indicated at 300 and is attached to the boring slide 302 that supports boring tool 304 and moves the boring tool endwise into a rotating workpiece 306 for boring a hole therein.

Such workpieces are very often of a material which is extremely difficult to cut, nickel, for example, and with such materials, it is extremely important for the rate of speed of the boring tool to be controlled accurately in order to bore the workpieces properly and in the shortest possible time. Other materials, such as extremely tough alloys can also be bored with greater efficiency, or cut otherwise with greater efficiency by the practice of the present invention.

It will be understood that this invention is susceptible to modification in order to adapt it to different usages and conditions; and, accordingly, it is desired to comprehend such modifications within this invention as may fall within the scope of the appended claims.

I claim:

1. In a reciprocating hydraulic motor including means for controlling the speed of reciprocation thereof; a cylinder, a piston reciprocably mounted in said cylinder, means for selectively admitting fluid to the opposite sides of said piston for reciprocating the same in said cylinder, a nut carried by the piston, a screw carried by the cylinder threadedly engaging said nut, a drive motor, and clutch means operable selectively for connecting the screw to the drive motor or for releasing said screw therefrom whereby the speed of operation of said drive motor when said screw is connected thereto determines the speed of movement of said piston, said screw being releasable from said drive motor for permitting substantially unrestricted advancing and retracting movements of the piston in the cylinder.

2. In a reciprocating hydraulic motor including means for controlling the speed of reciprocation thereof; a cylinder, a reciprocable plunger extending into the cylinder, a piston on said plunger in the cylinder, means for selectively supplying fluid to the opposite sides of the piston for reciprocating the piston and plunger in the cylinder, a nut carried by the piston, a screw carried by the cylinder extending through the nut and threaded thereto and extending reciprocably into the plunger, a drive motor carried by said cylinder, an electrically operable clutch energizable for connecting said drive motor to said screw and deenergizable for disconnecting the drive motor from the screw, and means for controlling the speed of said drive motor whereby when the drive motor is connected to the screw the rate of speed of the drive motor determines the rate of reciprocation of the piston and plunger in the cylinder.

3. In a reciprocating hydraulic motor including means for controlling the speed of reciprocation thereof; a cylinder, a plunger extending into the cylinder, a piston on the plunger in the cylinder, means for selectively directing fluid to the opposite faces of the piston for reciprocating the piston and plunger in the cylinder, a ball bearing nut carried by the piston, a screw carried be the cylinder extending threadedly through the nut and into the plunger, a drive motor selectively operable for driving said screw in rotation whereby to determine the rate of speed of movement of said piston and plunger in the cylinder, said plunger being hollow for reciprocably receiving said screw, and a passage extending through the piston into said plunger whereby fluid in the plunger escapes past said screw and the full area of the piston is utilized for developing thrusts thereon.

4. In a reciprocating hydraulic motor including means for controlling the speed of reciprocation thereof; a cylinder, a plunger extending into the cylinder, a piston on the plunger in the cylinder, means for supplying fluid selectively to the opposite sides of said piston for reciprocating the piston and plunger in the cylinder, a ball bearing nut carried by the piston, a screw extending threadedly through the nut and into the plunger, a drive motor carried by the cylinder, a shaft in the cylinder coaxial with the screw adapted for being selectively connected to the drive motor, a splined connection between the said shaft and said screw whereby the shaft rotatively drives said screw, a piston member carried by the screw, cylinder means in which the piston member is reciprocably mounted, and means for supplying fluid to and entrapping fluid in said cylinder means whereby the fluid pressure developed by the piston member when the said piston and plunger are advancing in the cylinder is indicative of the amount of thrust developed on the piston and plunger.

5. In a reciprocating hydraulic motor including means for controlling the speed of reciprocation thereof; a cylinder, a plunger extending into the cylinder and a piston on the plunger in the cylinder, means for selectively supplying pressure fluid to one side or the other of said piston for reciprocating the piston and plunger in the cylinder, a ball bearing nut carried by the piston, a screw in the cylinder extending threadedly through the nut from the side of the piston opposite the plunger, a shaft rotatably carried by the cylinder in axial alignment with said screw, a hydraulic drive motor carried by the cylinder for rotating the shaft, an electrically operated clutch selectively energizable for connecting said drive motor to said shaft, means for supplying pressure fluid to the drive motor simultaneously with the supply of pressure fluid to one side of said piston, and means for controlling the rate of fluid flow through said drive motor to control the speed of rotation thereof.

6. In a reciprocating hydraulic motor including means for controlling the speed of reciprocation thereof; a cylinder, a plunger extending into the cylinder and having a piston thereon in the cylinder, means for supplying fluid selectively to one side or the other of said piston for reciprocating the piston and plunger in the cylinder, a ball bearing nut carried by the piston, a screw extending through the piston and threadedly engaging the nut, a shaft carried by the cylinder coaxial with the screw, means for selectively driving said shaft at a predetermined speed of rotation, a splined connection between the screw and shaft so that the shaft is drivingly connected with said screw, cylinder means in said cylinder and positioned in the region of the shaft end of the said screw, a piston member reciprocably mounted in said cylinder means and held therein against rotation, means for supplying fluid to said cylinder means and for entrapping it therein, pressure sensitive means connected to said cylinder means, a ball bearing supporting the said piston member on said screw and means preventing relative axial movement between the piston member and screw so that axial movements of said screw will be transmitted to the said piston member, a ball bearing on the end of the screw opposite said shaft engaging the inside of the plunger for supporting the screw, and said pressure sensitive means being sensitive to the pressure in said cylinder means and being operable for controlling the supply of fluid to said hydraulic motor.

7. In a reciprocating hydraulic motor including means for controlling the speed of reciprocation thereof; a cylinder, a plunger extending into the cylinder and having a piston thereon in the cylinder, means for selectively supplying pressure fluid to one side or the other of said piston for reciprocating the piston and plunger in the cylinder, a ball bearing nut carried by the piston, a screw carried by cylinder extending threadedly through the nut, a drive motor carried by the cylinder for rotating the screw, means for selectively connecting the motor to the screw and for disconnecting the motor from the screw, said screw when disconnected from the motor rotating freely so as not to inhibit the movement of the piston and plunger in the cylinder, a source of fluid under pressure, a first valve having a first position where the fluid is directed from the source to the advancing side of said piston and having a second position where the fluid is directed from the source to the retracting side of said piston, a second valve between the first valve and the advancing side of said piston having a first position where the said first valve is connected with the advancing side of the piston and a second position wherein the said connection is interrupted and fluid is entrapped in the advancing side of said piston, said screw being adapted for a limited amount of axial reciprocation in said cylinder, pressure sensitive means between the screw and the cylinder resisting the said axial movement thereof when the piston is moving in its advancing direction, means for shifting said first and second valves into the said first positions to obtain advancing movement of said piston and plunger, and means operable while the screw is connected to the motor in response to predetermined variations in pressure on said pressure sensitive means for shifting said first valve to its second position to bring about immediate retraction of said piston and plunger.

8. In a reciprocating hydraulic motor including means for controlling the speed of reciprocation thereof; a cylinder, a plunger extending into the cylinder, a piston on the plunger in the cylinder, said piston having an advancing side on the side opposite the plunger and having a retraction side on the plunger side thereof, a nut carried by the piston, a screw in the cylinder threadedly engaging said nut, a drive motor carried by the cylinder, means for selectively connecting the drive motor to said screw for controlling the speed of rotation thereof, and controlling the speed of movement of the piston and plunger in the cylinder, pressure sensitive means between the cylinder and screw sensitive to axial thrusts exerted on the screw by the piston for developing a signal, a source of fluid under pressure, a first valve having a first position wherein the source of pressure is connected with the advancing side of the piston while the retracting side thereof is connected with exhaust and having a second position where the retracting side of the piston is connected with the said source while the advancing side thereof is connected with exhaust, a second valve interposed between said first valve and the advancing side of said piston having a first position where the connection between the first valve and the said advancing side of the piston is established and having a second position wherein the said connection is interrupted and fluid is entrapped on the advancing side of said piston, means for shifting said first and second valves to their respective first positions to initiate an advancing movement of said piston, means operable during said advancing movement for connecting the screw to the said drive motor therefore to control the rate of movement of the piston, and means sensitive to the signal from said pressure sensitive means for shifting said first valve to its second position upon the development of a predetermined resistance to movement of the said piston in its advancing direction thereby to bring about immediate retraction of said piston whenever the piston encounters a predetermined amount of resistance.

9. In a reciprocating hydraulic motor including means for controlling the speed of reciprocation thereof; a cylinder, a plunger extending into the cylinder, a piston on the plunger in the cylinder, said piston having an advancing side on the side opposite the plunger and having a retraction side on the plunger side thereof, a nut carried by the piston, a screw in the cylinder threadedly engaging said nut, a drive motor carried by the cylinder, means for selectively connecting the drive motor to the screw for controlling the speed of rotation thereof, and, therefore, controlling the speed of movement of the piston and plunger in the cylinder, pressure sensitive means between the cylinder and screw sensitive to axial thrusts exerted on the screw by the piston for developing a signal, a source of fluid under pressure, a first valve having a first position wherein the source of pressure is connected with the advancing side of the piston while the retracting side thereof is connected with exhaust and having a second position where the retracting side of the piston is connected with the said source while the advancing side thereof is connected with exhaust, a second valve interposed between said first valve and the advancing side of said piston having a first position where the connection between the first valve and the said advancing side of the piston is established and having a second position wherein the said connection is interrupted and fluid is entrapped on the advancing side of said piston, means for shifting said first and second valves to their respective first positions to initiate an advancing movement of said piston, means operable during said advancing movement for connecting the screw to the said drive motor therefore to control the rate of movement of the piston, and means sensitive to the signal from said pressure sensitive means for shifting said first valve to its second position upon the development of a predetermined resistance to movement of the said piston in its advancing direction thereby to bring about immediate retraction of said piston whenever the piston encounters a predetermined amount of resistance, the said drive motor for the screw being a rotary hydraulic motor, said rotary hydraulic motor being connected to receive actuating pressure fluid from the connection between the said first valve and said advancing means on the upstream side of said second valve, and means for controlling the rate of fluid flow through said drive motor to control the rate of rotation thereof.

10. In a reciprocating hydraulic motor including means for controlling the speed of reciprocation thereof; a cylinder, a plunger extending into the cylinder, a piston on the plunger in the cylinder, said piston having an advancing side on the side opposite the plunger and having a retraction side on the plunger side thereof, a nut carried by the piston, a screw in the cylinder threadedly engaging said nut, a drive motor carried by the cylinder, means for selectively connecting the drive motor to the screw for controlling the speed of rotation thereof, and, therefore, controlling the speed of movement of the piston and plunger in the cylinder, pressure sensitive means between the cylinder and screw sensitive to axial thrusts exerted on the screw by the piston for developing a signal, a source of fluid under pressure, a first valve having a first position wherein the source of pressure is connected with the advancing side of the piston while the retracting side thereof is connected with exhaust and having a second positon where the retracting side of the piston is connected with the said source while the advancing side thereof is connected with exhaust, a second valve interposed between said first valve and the advancing side of said piston having a first position where the connection between the first valve and the said advancing side of the piston is established and having a second position wherein the said connection is interrupted and fluid is entrapped on the advancing side of said piston, means for shifting first and second valves to their respective first positions to initiate an advancing movement of said piston, means operable during said advancing movement for connecting the screw to the said drive motor therefore to control the rate of movement of the piston, and means sensitive to the signal from said pressure sensitive means for shifting said first valve to its second position upon the development of a predetermined resistance to movement of the said piston in its advancing direction thereby to bring about immediate retraction of said piston whenever the piston encounters a predetermined amount of resistance, there being manually operable means and also means operable in response to a predetermined advancing movement of said piston and plunger for shifting said first valve to its said second position, to cause retraction of the piston and plunger, and means manually operable for selectively shifting said second valve to its said second position to halt said piston and plunger.

11. In a reciprocating hydraulic motor including means for controlling the speed of reciprocation thereof; a cylinder, a plunger extending into the cylinder and having a piston thereon in the cylinder, means for supplying fluid selectively to one side or the other of said piston for reciprocating the piston and plunger in the cylinder, a ball bearing nut carried by the piston, a screw extending through the piston and threadedly engaging the nut, a shaft carried by the cylinder coaxial with the screw, means for selectively driving said shaft at a predetermined speed of rotation, a splined connection between the screw and shaft so that the shaft is drivingly connected with the screw but permitting reciprocation of the screw relative to the shaft, cylinder means in the cylinder in the region of the shaft end of the said screw, a piston member reciprocally mounted in said cylinder means and held therein against rotation, means for supplying fluid to said cylinder means and for entrapping it therein, pressure sensitive means connected to said cylinder means, a ball bearing supoprting the said piston member on said screw and means preventing relative axial movement between the piston member and screw so that axial movements of said screw will be transmitted to the said piston member, a ball bearing on the end of the screw opposite said shaft engaging the inside of the plunger for supporting the screw, said pressure sensitive means being sensitive to the pressure in said cylinder means and being operable for controlling the supply of fluid to said hydraulic motor, and means operable for making said pressure sensitive means effective during a portion only of the advancing and retracting movements of said piston and plunger.

References Cited in the file of this patent
UNITED STATES PATENTS

| | | |
|---|---|---|
| 1,521,329 | Sears | Dec. 30, 1924 |
| 2,235,085 | Roehm et al. | Mar. 18, 1941 |
| 2,953,121 | Pauquet | Sept. 20, 1960 |